United States Patent [19]

Foran, Jr. et al.

[11] Patent Number: 4,996,888

[45] Date of Patent: Mar. 5, 1991

[54] FLUID FLOWMETER

[75] Inventors: Charles D. Foran, Jr., Richardson, Tex.; William J. LoPresti, Lutz, Fla.

[73] Assignee: Flowdata, Inc., Richardson, Tex.

[21] Appl. No.: 391,198

[22] Filed: Aug. 9, 1989

[51] Int. Cl.$^5$ .............................................. G01F 3/10
[52] U.S. Cl. ...................................... 73/261; 73/253
[58] Field of Search ...................... 73/253, 261, 861.87

[56] References Cited

U.S. PATENT DOCUMENTS

| | | |
|---|---|---|
| 294,026 | 2/1984 | Fitts . |
| 3,069,907 | 12/1962 | Eddy . |
| 3,255,630 | 6/1966 | Karlby et al. ..................... 73/261 |
| 3,342,071 | 9/1967 | Meyers . |
| 3,388,595 | 6/1968 | Last . |
| 3,413,851 | 12/1968 | Curtiss . |
| 3,457,835 | 7/1969 | Sufold . |
| 3,685,353 | 8/1972 | Gester . |
| 3,695,106 | 10/1972 | Geisow . |
| 3,707,872 | 1/1973 | Masson . |
| 3,710,623 | 1/1973 | Boyd et al. . |
| 3,733,910 | 5/1973 | Evans . |
| 3,811,323 | 5/1974 | Swanson . |
| 3,858,448 | 1/1975 | Evans et al. . |
| 4,023,410 | 5/1977 | Althaus . |
| 4,210,410 | 9/1980 | Ohtani . |
| 4,295,369 | 10/1981 | Wendelboe . |
| 4,329,130 | 5/1982 | Nagata . |
| 4,345,480 | 8/1982 | Basham . |
| 4,409,829 | 5/1984 | Weber . |
| 4,451,207 | 5/1984 | Hoffman . |
| 4,461,174 | 7/1984 | Han ........................ 73/861.87 |
| 4,579,008 | 4/1986 | Bohm . |
| 4,641,522 | 2/1987 | LoPresti . |

FOREIGN PATENT DOCUMENTS

| | | |
|---|---|---|
| 0031317 | 12/1980 | European Pat. Off. . |
| 2830563 | 1/1980 | Fed. Rep. of Germany . |
| 55-90819 | 9/1980 | Japan . |
| 57-73624 | 5/1982 | Japan . |

Primary Examiner—Herbert Goldstein
Attorney, Agent, or Firm—James Creighton Wray

[57] ABSTRACT

A fluid volumetric flowmeter has a wall plate forming a chamber and a fluid inlet, and a fluid outlet. Two rotors positioned within the chamber have intermeshing lobes and valleys for turning in the chamber as fluid flows from the inlet through the chamber to the outlet. At least one of the rotors has a radial recess for receiving a magnet. A shaft mount is connected to the wall plate. A response shaft is rotationally mounted in the shaft mount, and an indicator rotates with the shaft. A first magnetic coupling is mounted in the rotor recess. A second magnetic coupling is mounted on the shaft within the rotor hub and within the first magnetic coupling for rotating the second magnetic coupling, the shaft, and the indicator in response to rotation of the rotors. First paired coin-shaped magnets are aligned on magnetic axes extending diametrically through the rotor axis. Second grouped coin-shaped magnets are aligned on the single magnetic axis within the rotor hub.

20 Claims, 4 Drawing Sheets

FLUID FLOWMETER

BACKGROUND OF THE INVENTION

Well know fluid flowmeters use paired rotors on parallel shafts within intersecting cylindrical chambers. Fluid flows into the chamber, turns the rotors, and exits the chamber. The number of turns of the rotors is measured to indicate the amount of fluid flow. Perhaps the best known types of flowmeters with paired rotors are water meters.

One problem generally associated with the meters is the accuracy in reading. Often readings are taken by extending shafts, on which the rotors are mounted, through the walls of the chambers and the mounting gears on the extended shafts to turn meters. In many cases that is satisfactory.

In meters which require high accuracy the extended shafts may not be useful, and other forms of measuring become important. Some forms of measurement have used sensors on the outside of a chamber to sense movement of lobes within the chamber. Some of those forms use magnets embedded in the lobes within the chamber and sensors outside of the chamber to sense the passage of magnets. Other devices have used magnetic couplings between shafts turning on bearings within the chamber and shafts outside of the chamber.

Difficulty in magnetic coupling and in conforming indicator load to available torque produced by the rotors within the chamber has produced varied success. The problem is intensified when using the meters with fluids which are inimicable to the use of bearings, viscous fluids, varied fluids or fluids which require periodic cleaning of the meters.

An example of such a fluid is automotive paint.

In the course of painting automobiles it is important to precisely control the amount of paint being applied to the automobile and to coordinate the amount of paint being applied with the relationship of the applicators to the automobile body.

Paint lines and meters must be periodically cleaned with solvents having viscosities greatly differing from the paint. While it is not necessary to precisely measure the solvents, it is extremely important that all of the paint be taken from the meter and all of the solvents be removed from the meter. Consequently, it is highly desirable to use meters without bearings and ones which are easily and effectively cleaned.

The present invention is directed to the provision of such meters with highly accurate internal flow characteristics and highly accurate external measuring systems.

SUMMARY OF THE INVENTION

A fluid volumetric flowmeter has a casing forming a chamber, a fluid inlet, and a fluid outlet communicating with the chamber. Two rotors positioned within the chamber have intermeshing lobes and valleys for turning in the chamber as fluid flows from the inlet through the chamber to the outlet. At least one of the rotors has a recess for receiving a magnet. In one form of the invention the recess is in a portion of a rotor. In a preferred form the recess is radial. A shaft mount is connected to a wall of the casing. A response shaft is rotationally mounted in the shaft mount. An indicator connected to the shaft rotates with the shaft. A first magnetic coupling is mounted in the rotor recess of the rotor. A second magnetic coupling is mounted on the shaft near the first magnetic coupling for rotating the second magnetic coupling, the shaft, and the indicator in response to rotation of the rotors.

Preferably, the shaft mount is cantilevered from a recess in the wall of the casing. In a preferred embodiment, the rotor mount has a recess, in which the second magnetic coupling is positioned. Preferably, the recess in the rotor mount faces the hub of the rotor. In one preferred embodiment, the shaft extends from the shaft mount, and the indicator is mounted on the extended portion of the shaft. In a preferred construction, the casing has a chamber-forming plate or wall having two joined circular chamber portions. The preferred casing has a cover and bolts and alignment pins for connecting the cover and the chamber-forming portion. Preferably, the shaft is mounted on the wall plate.

In a preferred form, the second magnetic coupling is mounted within a recess in the wall plate.

A preferred wall plate is a flat plate having a chamber recess and a shaft recess extending inward from opposite surfaces of the plate. The shaft mount is partially positioned in the shaft recess, and the shaft recess extends into an axle which extends into the chamber recess for mounting a rotor. The second magnetic coupling is mounted in the recess in the rotor mount. A preferred indicator shaft has a central bearing portion, a proximal magnetic coupling portion, and a distal indicator mounting portion.

In the preferred meter, the central bearing portion is held in the shaft mount, which extends outward from within the wall of the casing. The second magnetic coupling portion is held within the casing plate, and the indicator portion is positioned outward from the wall of the casing.

Preferably, the first magnetic coupling is plural elements fixed on a transverse magnetic axis within the rotor recess for rotating with the rotor, and the second magnetic coupling is an element fixed on the shaft in alignment with the magnetic axis for rotating with the shaft.

In preferred embodiments, a second rotor is mounted on a shaft which extends inward from a fixed position in the wall plate.

A preferred fluid flow measuring method flows fluid into a chamber, flows fluid out of a chamber, and rotates rotors within the chamber, while intermeshing lobes and valleys on the rotor. A first radially aligned magnetic coupling is rotated with one of the rotors. An indicator shaft is mounted in an external wall of the chamber, and a second magnetic coupling is mounted on an end of the indicator shaft within the first coupling on the rotor. The indicator shaft rotates with the second magnetic coupling as the rotor and first magnetic coupling rotate, thereby rotating an indicator connected to a distal end of the indicator.

The measuring method supports the indicator shaft medially on a shaft mount extending out of the plate, mounts the second coupling on a proximal end of the shaft, and mounts the indicator on a distal end of the shaft.

The preferred measuring method fixes the magnetic coupling on the proximal end of a connector for the indicator shaft before inserting the indicator shaft in the connector, and positions the second magnetic coupling in a recess in the support bushing when positioning the indicator shaft and the support bushing in the plate before mounting the indicator on a distal end of the shaft.

Preferably, the measuring method mounts the support bushing partially within a recess of a cover plate and positions the second magnetic coupling in the rotor mount recess in spaced magnetic axial alignment with the first magnetic coupling.

The preferred method includes flowing fluid outward from hubs on the rotors through facial grooves which extend radially on lateral wall and cover engaging axial centering side portions of the rotors.

In a preferred embodiment, the magnetic couplings are uniformly formed of balanced coin-shaped magnets. Two are inserted in each recess in the rotor and three are fixed on an end of an indicator shaft.

Other advantages and features of the invention will be apparent from the disclosure, which includes the above and ongoing specification with the claims and the drawings.

DETAILED DESCRIPTION OF THE DRAWINGS

Figure 1:
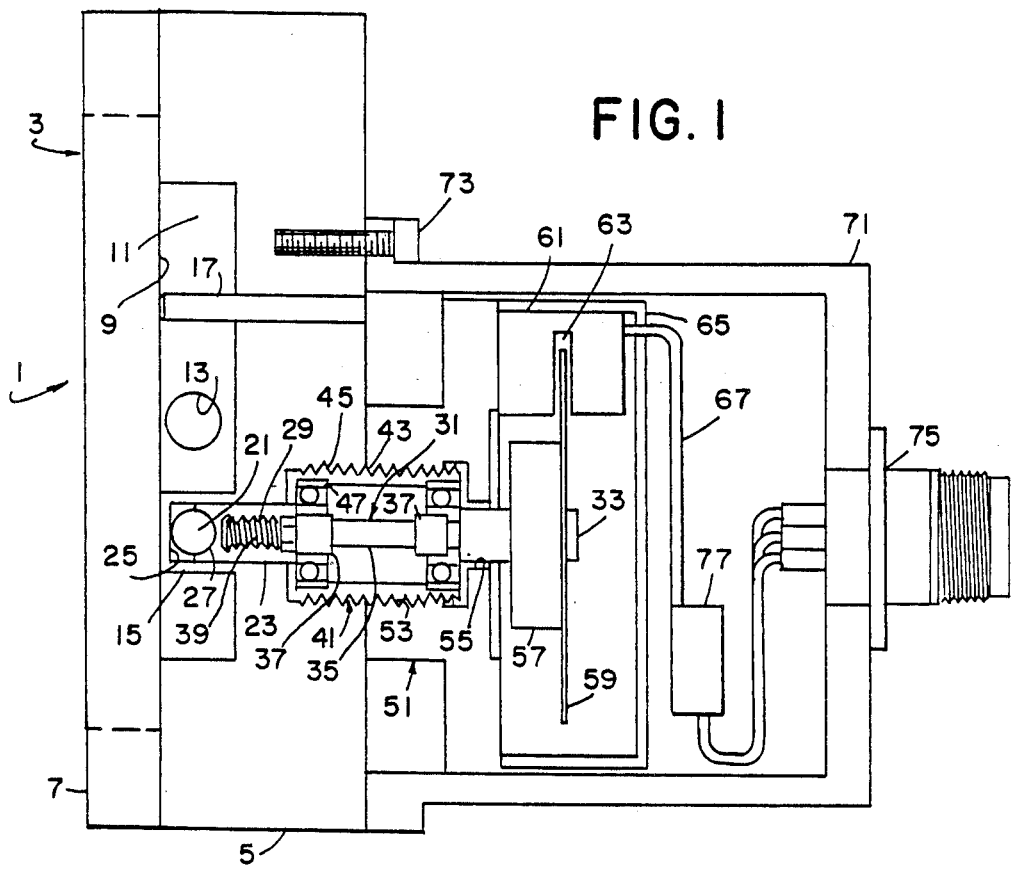
FIG. 1 is a sectional view of a preferred meter showing a magnetic coupling.

Referring to FIG. 1, a preferred flowmeter is generally indicated by the numeral 1. The flowmeter has a casing 3 which includes a chamber-forming wall plate 5 and a front cover 7. A central portion 9 of the interface on cover 7 forms a front wall of chamber 11. Chamber 11 has an inlet 13 and an opposite outlet. Two rotors rotate within the chamber on axles 15 and 17. Axle 17 is a pin press-fit within an opening 19 within the casing. Axle 15 is integrally formed with the wall plate 5. Cover 7 is joined to wall plate 5 with bolts which extend through the cover into tapped holes in the wall plate, and locator pins which are fixed in the wall plate and extend into locator holes in the cover. A gasket is interposed. Ends of axles 15 and 17 extend to the inner wall 9 of the cover. The first magnetic coupling will be described with reference to the first rotor shown in FIGS. 2 and 3 and the magnetic coupling schematic shown in FIG. 4. The second magnetic coupling 21 is mounted on a magnet hub 23 in the central recess 25 of axle 15. The magnetic hub 23 has a forward facing cylindrical groove 27 in which a cylindrical magnet 21 is bonded. As later described, the cylindrical magnet 21 or bar magnet may be formed of stacked and bonded coin-shaped magnets. Magnet hub 23 has an internal threaded bore 29 at its opposite end which receives threads on the end of indicator shaft 31. The indicator shaft 31 has an indicator mounting portion 33, a central bearing portion 35 with bearing surfaces 37, and a threaded end portion 39 which tightly secures the threads 29 of magnet hub 23. A bearing mount 41 has external threads 43 which are received in a threaded opening 45 in wall plate 5. Ball bearings 47 are fitted in opposite ends of the bearing mount 41.

The indicator may be any type of indicator. For example, a gear mounted on the indicator shaft may have teeth which are counted as they pass a proximity sensor. A fiber optic detector may be used, or an optical encoder may provide rotational indications. In one embodiment, as shown in FIG. 1, an optical reader mount 51 has an internally threaded opening 53 which receives external threads 43 on bearing mount 41, tightly securing the optical reader mount against the wall plate 5 and tightly securing the bearing mount 41 within the wall plate 5 and the optical reader mount 51. The enlarged indicator mounting portion 33 of shaft 31 passes through opening 55 in the optical reader mount 51.

A hub 57 supporting transparent glass indicator disk 59 is mounted on the indicator mounting portion 33 of shaft 31. The disk contains reflective and non-reflective incremental areas. Hood 61 is supported with bolts extending into tapped holes on the flange of indicator support 51. An LED source on one side of hood 61 transmits focused infra red light through the glass disk 59 to a photocell on an opposite side of the slot 63, except when periodically interrupted by opaque areas on the disk. The hood 61 has an LED and a light sensor on opposite sides of a narrow slot 63 which receives a portion of the disk 59 as the disk rotates. A light cover 65 is also supported on the flange of the indicator support 51. Electrical wires 67 supported in hood 61 conduct electrical energy to supply a focused infra-red light-emitting diode and to receive electrical signals from one or more light sensors on the opposite side of the encoder disk 59.

Indicator cover 71 is mounted on wall plate 5 with bolts 73, which extend into tapped holes in the wall plate. A meter readout 75 is mounted on the cover 71. The light source used for the meter is a focused infrared LED light source. One or more photoelectric cells are used as sensors. The light source and sensors may be positioned in hood 61 with the logic circuits, and the readout may be positioned in the indicator case 75. 77 is a multiple wire connector.

Figure 2:
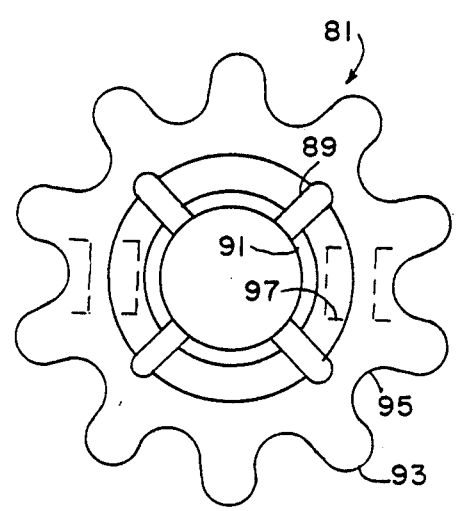
FIG. 2 is a side elevation of one rotor for the meter shown in FIG. 1.
Figure 3:
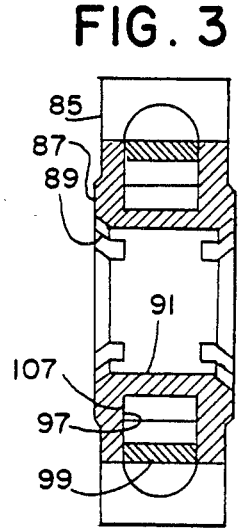
FIG. 3 is a sectional elevation of the rotor showing a preferred first magnetic coupling.

In an alternate form, the disk may contain regular discrete magnetically sensible elements along its periphery. A magnetic pickup may convey information pulses along lines 67 and connector 77 to reader 75. An optical source and detector may be positioned in reader 75, with lines 67 representing optic fiber bundles. A first rotor is generally referred to by the numeral 81 in FIGS. 2 and 3. Rotor 81 has a body 83 with side walls 85, which are extended laterally 87 near the hub portions. Grooves 89 are formed in the side walls to cause fluid to flow away from the hub area 91 as the rotor turns. The extended side walls areas 87 help space the rotor from sidewalls of the chamber 11. The rotor shown in FIG. 2 is formed with ten equally spaced lobes and grooves, which are generally semi-cylindrical. The grooves have slightly larger radii than the lobes and are centered on a radius which is slightly less than the radius on which the lobes are centered.

The spacing provides smooth, accurate operation, with the lobes 93 fitting within the grooves 95.

Figure 4:
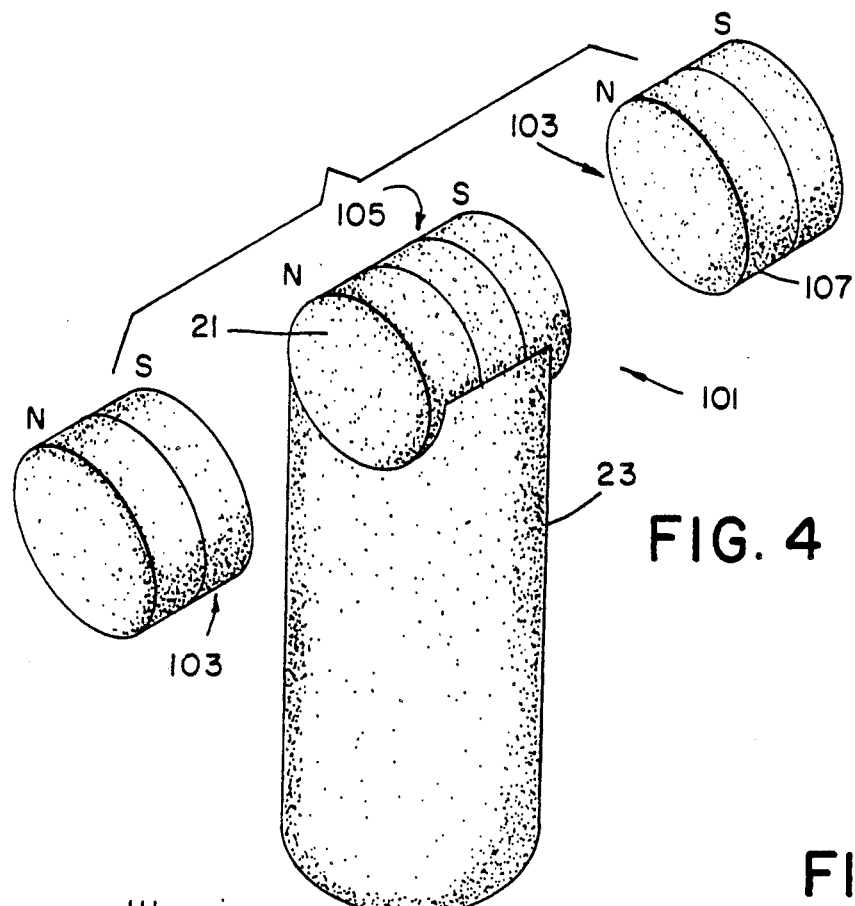
FIG. 4 is a perspective schematic view of the preferred magnetic coupling.
Figure 5:
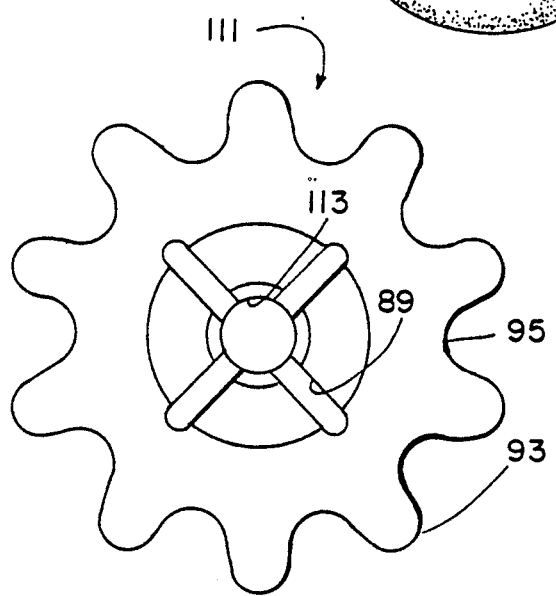
FIG. 5 is a side elevation of a second rotor. The second rotor is identical, except that the sizes of the bores vary. The recessed area of the first rotor is replaced by a solid portion in the second rotor.
Figure 6:
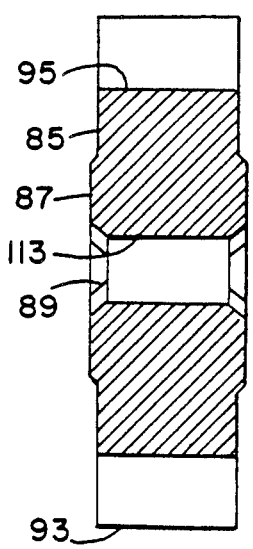
FIG. 6 is a cross sectional elevation of the second rotor shown in FIG. 5.

Diametrically opposed flat bottom bores 97 are formed within the rotor. Two small coin-shaped magnets are tightly secured within the bores and are sealed within the bores by plugs 99. As shown in FIG. 4, the magnetic coupling arrangement is generally indicated by the numeral 101 and includes first magnetic couplings 103 and a second magnetic coupling 105, which includes three coin-shaped magnets 21 mounted on magnet hub 23 on the indicator shaft. All of the magnets may be generally referred to a coin-shaped in the application since they have thicknesses thinner than their diameter. Two coin-shaped magnets 107 are held together and are bonded in each diametrically opposed bore 97 in rotor 81. Since the magnets have a powerful attractive force, they may be held in the bores with their own magnetic force.

When the rotor 81 is assembled on axle 15 and when the shaft 31 positions the second coupling magnets 21 within the axle, a magnetic coupling 101 as shown in FIG. 4 is created in which all of the magnets operate as bar magnets with a single magnetic axis forming a strong magnetic coupling that is not easily dislodged.

The second rotor 111 has a configuration similar to the first rotor, but has a smaller hub 113 which is mounted on the axle pin 17 as shown in FIG. 1. The sidewall extensions 87 are slightly larger in radial dimension than the sidewall extensions 87 shown in FIG. 3 to compensate for the greater distance between the hub 113 and the roots of the grooves 95. The sidewall grooves 89 flow fluids away from the hub 113 as rotor 111 rotates to ensure against buildup or stagnation of fluid near the rotor hub and to ensure cleaning of the wall-rotor interfaces.

Figure 7:
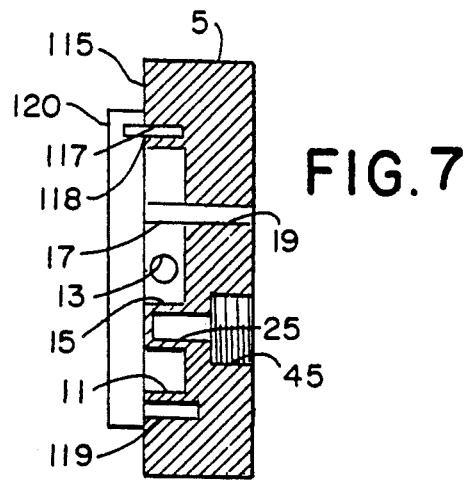
FIG. 7 is an elevational cross sectional detail of the casing show in FIG. 1.
Figure 8:
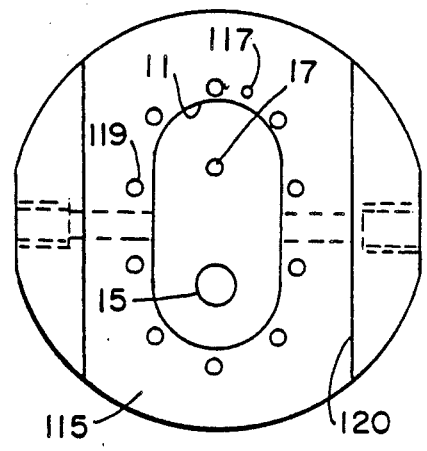
FIG. 8 is a front elevational cross sectional detail of the preferred casing shown in FIG. 7.
Figure 10:
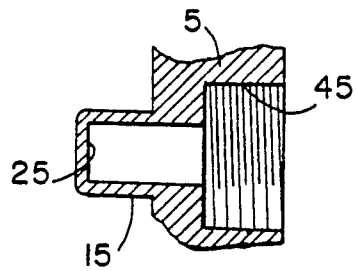
FIG. 10 is a detail of the recessed rotor shaft which is integrally formed with the casing shown in FIG. 7.

As shown in FIG. 7 and the detail which is FIG. 10, the casing wall plate 5 has an integrally formed rotor mounting axle 15, with a recess 25 for the second magnetic coupling. Threaded bore 45 receives the indicator mount 41 shown in FIG. 1. The size of recess 25 is sufficient so that the magnets in second coupling 105 may be directly axially aligned with the magnets in the first couplings 103 and the rotor.

Axle 17 is press-fit in bore 19 in the casing wall plate 5. The face 115 of the casing wall plate is provided with bores 117 for receiving locator pins 118 extending into blind bores within the cover. Face 115 also has tapped bores 119 for receiving bolts extending through the cover. Sides 120 extend outward from face 115 to provide enlarged inlet and outlet coupling portions. Cover 7 fits on face 115 between the sides 120 and has similar locator pin receiving blind bores and through holes for receiving cover fastener bolts.

Figure 9:
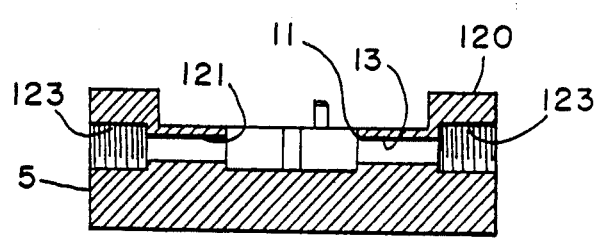
FIG. 9 is a cross sectional elevation of the preferred casing shown in FIGS. 7 and 8.

As shown in FIG. 9, the chamber 11 is supplied with an inlet 13 and an outlet 121. The inlet and outlet are provided with threaded bores 123 to receive inlet and outlet pipes for fluid being measured.

Figure 11:
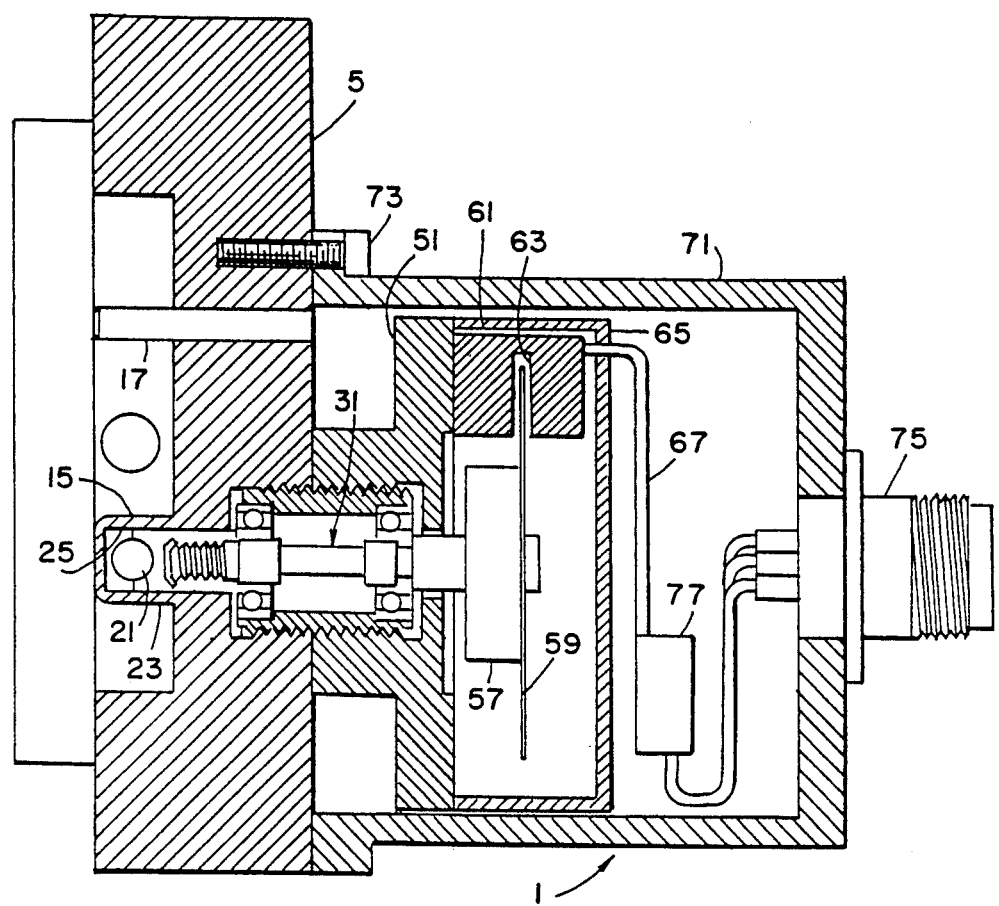
FIG. 11 is a computer drawn elevational cross section of the meter shown in FIG. 1.

FIG. 11 shows elements of FIG. 1 in computer-shaded detail, which may be easier to appreciate by one initially reading the specification.

While the invention has been described with reference to specific embodiments, modifications and variations of the invention may be constructed without departing from the scope of the invention, which is described in the following claims.

I claim:

1. A fluid meter comprises a casing having a chamber and a fluid inlet and a fluid outlet communicating with the chamber; first and second rotors are positioned within the chamber and have intermeshing lobes and valleys for turning in the chamber as fluid flows from the inlet through the chamber, around the rotors and out through the outlet, the first rotor has radial recesses for receiving a first magnetic coupling; a hollow rotor mounting axle is connected to a wall of the casing and extends into the chamber within a hub of the first rotor; a response shaft is rotationally mounted within the rotor axle; an indicator is connected to a distal end of the shaft for rotating with the shaft; a first magnetic coupling is mounted in the recess of the rotor, and a second magnetic coupling is mounted on a proximal end of the shaft within the rotor axle and near the first magnetic coupling such that magnetic axes of the first coupling and the second coupling are perpendicular to rotational axis of the shaft, for rotating the second magnetic coupling, the shaft and the indicator in response to rotation of the rotors.

2. The meter of claim 1, wherein a shaft bearing mount surrounds the shaft and is mounted in a bearing recess in the wall of the casing.

3. The apparatus of claim 1, wherein the rotor mounting axle is a hollow stub axle in which the second magnetic coupling is positioned in radial alignment with the first magnetic coupling.

4. The meter of claim 3, wherein the hollow portion of the stub axle forms a response shaft chamber for rotationally mounting the response shaft within the rotor axle, said chamber opening in the direction of the bearing recess in the casing wall.

5. The meter of claim 4, wherein the shaft extends from and wherein the indicator is mounted on the extended portion of the shaft.

6. The meter of claim 2, wherein the casing has a chamber-forming wall plate with a joined chamber cover and means for connecting the cover and the chamber-forming wall plate, said joined wall plate chamber cover forming the chamber, and the rotor mounting axle extends within the chamber from the wall plate to the cover.

7. The meter of claim 6, wherein the wall plate comprises a flat plate having a chamber-forming recess extending inward from an outer surface of the plate, and wherein the rotor mounting axle extends from the plate into the chamber-forming recess, and wherein the rotor mounting axle has a shaft receiving recess facing in a direction away from the chamber-forming recess in the plate, and wherein the second magnetic coupling is mounted in the shaft receiving recess within the rotor mounting axle.

8. The meter of claim 6, wherein the shaft has a central bearing portion, a proximal magnetic coupling portion, and a distal indicator mounting portion.

9. The meter of claim 8, wherein the central bearing portion is held in a bearing mount which extends from the wall plate of the casing, and wherein the bearing mount is held within the wall plate of the casing, and wherein the indicator holding portion is positioned outward from the wall plate of the casing.

10. The meter of claim 1, wherein the first magnetic coupling is fixed within the rotor recesses for rotating with the rotor, and wherein the second magnetic coupling is fixed on an end of the shaft for rotating with the shaft.

11. The meter of claim 10, wherein the second rotor is mounted in a stub shaft which extends inward from a fixed position in the casing.

12. A fluid meter comprises a casing having a chamber and a fluid inlet and a fluid outlet communicating with the chamber; first and second rotors are positioned within the chamber and have intermeshing lobes and valleys for turning in the chamber as fluid flows from the inlet through the chamber, around the rotors and out through the outlet; the first rotor has radial recesses for receiving a first magnetic coupling; a hollow rotor mounting axle is connected to a wall of the casing and extends into the chamber within a hub of the first rotor; a response shaft is rotationally mounted within the rotor axle; an indicator is connected to a distal end of the shaft for rotating with the shaft; a first magnetic coupling is mounted in the recess of the rotor, and a second magnetic coupling is mounted on a proximal end of the shaft within the rotor axle and near the first magnetic coupling for rotating the second magnetic coupling, the shaft and the indicator in response to rotation of the rotors, wherein the first magnetic coupling comprises first radially aligned magnets in the rotor.

13. The meter of claim 12, wherein the first magnets are diametrically aligned on opposite radii of the rotor.

14. The meter of claim 13, wherein the magnets are coin-shaped magnets aligned as bar-like magnets with an axis perpendicular to the rotor axis.

15. The meter of claim 14, wherein the second magnetic coupling comprises coin-shaped magnets cantilevered on an end of the shaft and aligned as a bar magnet in magnetic axial alignment with the bar-like magnets of the first coupling.

16. The meter of claim 12, wherein the second magnetic coupling comprises second magnets on an end of the shaft and aligned in diametrical and magnetic axial alignment with the first magnets in the rotor.

17. The fluid flow measuring method comprising mounting first magnets in radial recesses in a first rotor, flowing fluid into a chamber through the chamber and out of the chamber, and rotating rotors within the chamber with the fluid flow and intermeshing lobes and valleys on the rotors as they rotate, rotating a first magnetic coupling with one of the first rotor, mounting an indicator shaft in an external wall of the chamber and mounting a second magnetic coupling on a proximal end of the indicator shaft within the first coupling on the first rotor such that magnetic axes of the first coupling and the second coupling are perpendicular to rotational axis of the shaft, rotating the indicator shaft with the second magnetic coupling as the first rotor and first magnetic coupling rotate, and rotating an indicator connected to a distal end of the shaft.

18. The measuring method of claim 17, further comprising supporting the indicator shaft medially with a support partially within the wall and partially cantilevered from the wall.

19. The fluid flow measuring method comprising mounting first magnets in radial recesses in a rotor, flowing fluid into a chamber through the chamber and out of the chamber, and rotating rotors within the chamber with the fluid flow and intermeshing lobes and valleys on the rotors as they rotate, rotating a first magnetic coupling with one of the rotors, mounting an indicator shaft in an external wall of the chamber and mounting a second magnetic coupling on a proximal end of the indicator shaft within the first coupling on the rotor, rotating the indicator shaft with the second magnetic coupling as the rotor and first magnetic coupling rotate, and rotating an indicator connected to a distal end of the shaft, wherein mounting the second magnetic coupling comprises mounting coin-shaped magnets as a second bar magnet and aligning a magnetic axis of the second bar magnet radially on the proximal end of the indicator shaft and inserting the indicator shaft in a support bushing on the wall and positioning the second magnetic coupling in a recess extending into the chamber within an axle of the rotor when positioning the indicator shaft in the support bushing.

20. The measuring method of claim 19, further comprising mounting the support partially within a recess of a chamber-forming plate and positioning the second magnetic coupling in spaced magnetic axial alignment with the first magnetic coupling.

* * * * *